Sept. 27, 1966  C. M. ADAMS, JR  3,275,481
METHOD OF FLAME HARDENING WELDED STRUCTURES
Filed Feb. 21. 1964  4 Sheets-Sheet 1
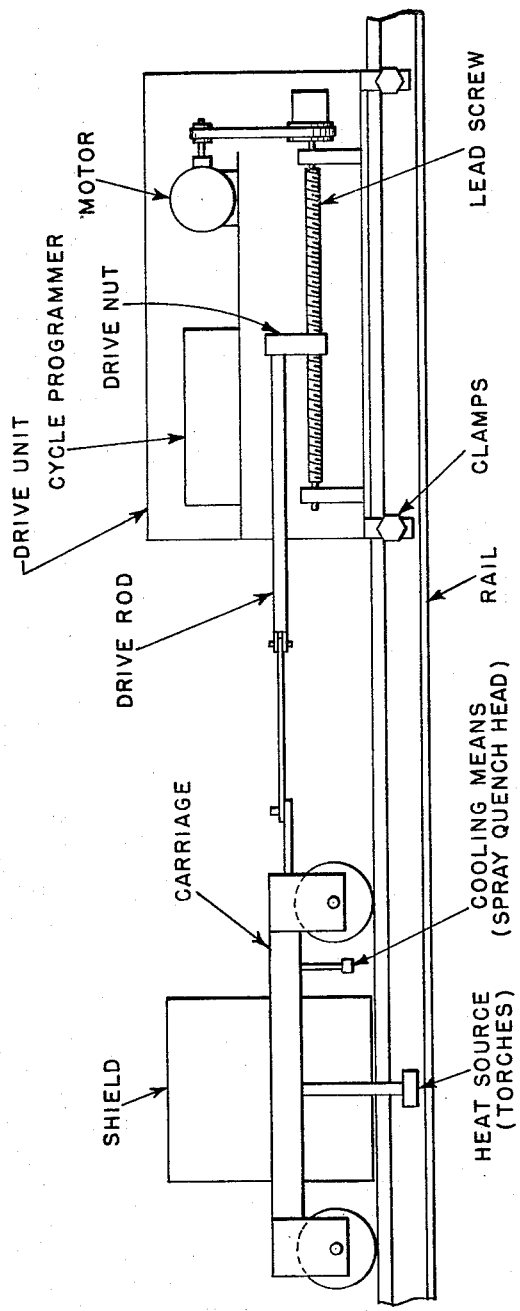
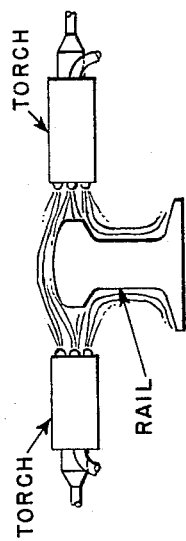
INVENTOR
CLYDE M. ADAMS, JR
BY
ATTORNEY Sept. 27, 1966   C. M. ADAMS, JR   3,275,481
METHOD OF FLAME HARDENING WELDED STRUCTURES
Filed Feb. 21, 1964   4 Sheets-Sheet 2

INVENTOR
CLYDE M. ADAMS, JR.
BY
ATTORNEY

Sept. 27, 1966      C. M. ADAMS, JR      3,275,481
METHOD OF FLAME HARDENING WELDED STRUCTURES
Filed Feb. 21, 1964      4 Sheets-Sheet 3

INVENTOR
CLYDE M. ADAMS, JR.
BY
ATTORNEY

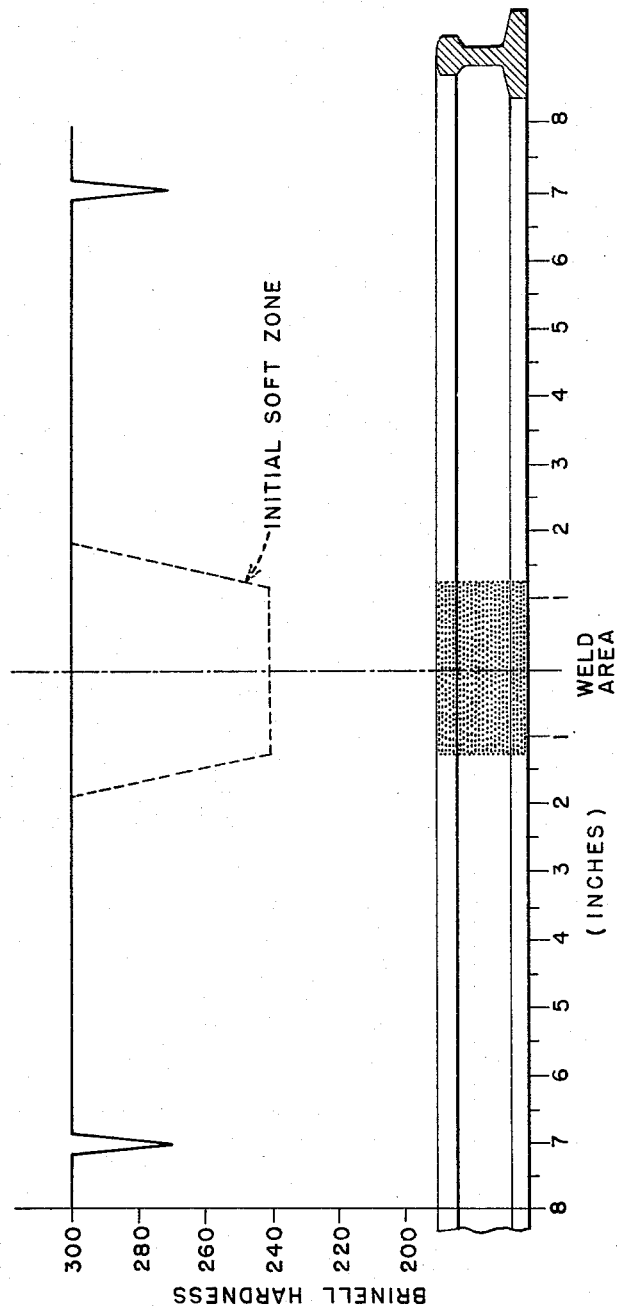

UNITED STATES PATENT OFFICE 3,275,481
Patented Sept. 27, 1966

3,275,481
METHOD OF FLAME HARDENING WELDED STRUCTURES
Clyde M. Adams, Jr., Lexington, Mass., assignor to American Machine & Foundry Company, a corporation of New Jersey
Filed Feb. 21, 1964, Ser. No. 346,550
8 Claims. (Cl. 148—127)

This invention relates to methods of hardening localized areas in relatively large heat treatable metal structures, and more particularly to localized hardening performed following welding or other treatment which has adversely affected the properties of the metal.

The many metals that can be hardened and/or strengthened by appropriate heat treatment are well known to those skilled in the art, and in the interest of brevity they cannot all be listed herein. This invention relates mainly to the heat treatment of low alloy steel, precipitation or age-hardenable alloys, and other alloys which are generally understood to be heat treatable.

The need for the present type of heat treatment generally arises when, in the course of fabrication or other treatment, a structure which has previously been heat treated to obtain optimum properties is subjected to local heating which adversely changes these properties in the localized area directly involved in such fabrication or other treatment. The most typical case in which this problem arises is in fusion welding (e.g. ordinary arc welding, thermite welding, flash or oxyacetylene pressure welding, and submerged melt welding) in the course of which a previously hardened region will be left in a softened condition after cooling. In operations where relatively small structures are involved, this condition can be remedied simply by heat treatment of the entire structure to restore the desired overall properties. However, in the case of medium-sized or very large structures, overall heat treatment is impractical because of both size alone and of the difficulty of maintaining dimensional stability during treatment. For reasons explained hereafter, partial or local heat treatment (i.e., limited to the area affected adversely) has not been satisfactory in that rehardening of the intended area has been at the expense of creating new adversely affected areas surrounding that area. This invention is concerned primarily with the attainment of satisfactory localized heat treatment in massive structures of this type, which cannot be subjected to overall heat treatment.

Most heat treatable metals, including particularly the important low alloy steels, are susceptible to two main critical temperatures which determine their structure and consequently their properties such as hardness. With fully heat treated low alloy steel, one of these temperatures is the austenitizing temperature, which is typically approximately 1550 degrees F. Depending upon the specific composition, the other is a lower temperature, typically around 900 degrees F., at which the steel was tempered (i.e., the temperature to which steel is reheated after quenching). Steel which has been heated above the austenitizing temperature can be quenched from that temperature and retempered to accomplish full development of desired properties. If heated to or quenched from below the aforementioned lower critical temperature, the steel will not experience any change in properties. It is the range of temperature between the tempering temperature and austenitizing temperature that is troublesome because, being in effect over-tempered, it is softened, and upon quenching it will exhibit low strength.

If a concentrated area such as a welded joint is heated above the austenitizing temperature by means of a stationary heat source, surrounding areas will attain lower maximum temperatures. The maximum temperatures of these surrounding areas will be according to a temperature curve which slopes downwardly in progression away from the concentrated directly heated area. Within this range, extending downwardly from maximum temperature at the heated zone to ambient temperature at some remote point, there will be a considerable transition zone which experiences maximum temperatures within the critical range discussed above. This "transition zone" will be referred to frequently herein, and will be understood to mean the troublesome range between the two upper and lower temperatures from above or below which, respectively, a heat treatable metal will not be adversely affected upon rapid cooling.

From the above discussion of basic principles it will be evident that if any adversely affected zone, such as a fusion weld, is locally heated above the upper critical temperature and then quenched, this particular zone will be restored to hardness but surrounding areas which have attained maximum temperatures within the "transition zone" will be softened. By way of example, this invention was conceived in response to a need arising from the fusion welding of hardened "crane rail" of the type used in naval yards and docks. Hardness of these rails is necessary because of the static loads, of the order of thousands of tons, which they must bear. Prior to this invention it had been impossible to effect local flame hardening of only a weld zone without creating substantial softened areas at both sides of the weld. The only recourse had been to flame-harden an entire railway, starting from one end and working slowly and uninterruptedly toward the other, which obviously is impractical and wholly unfeasible economically.

Accordingly, it is the principal object of this invention to overcome the aforementioned problems associated with the localized heat treatment of relatively large, massive structures. In particular, it is the object of this invention to achieve hardening of a localized area such as a weld without creating substantial new soft areas in surrounding zones.

In accordance with this invention there is involved a method of operation of heat sources and cooling means which move relative to a workpiece. In this method, the rate of movement of the heat source and the rate of heat input are purposely related to estabilsh very sharp temperature gradients (and a correspondingly steep temperature curve) in the critical "transition zone," and hence the width of this zone is very narrow. When this steepness of the temperature curve extending through the transition zone between the upper and lower critical temperatures is established, if the workpiece is immediately cooled very rapidly it will be found that any relatively soft areas created within this narrow zone will be so small as to be negligible. The establishment of these sharp temperature gradients is achieved by the combination of fast rate of travel of the heat source, a very high rage of heat input and a short "hot zone." In connection with this rapid establishment of gradients, it should be noted that metallurgical transformations are related to both the temperature and duration of heating and, in the present method, any part of the workpiece at the transition zone experiences these intermediate temperatures (which normally would produce over-tempering if sustained) for no longer than a very short duration of time. The mathematical aspects of these physical relationships and phenomena will be explained more fully in the detailed description to follow. Briefly, they involve the fact that the temperature gradients associated with the leading edge of a traveling hot zone increase with increasing rate of travel and decrease with decreasing length of the hot zone. Also, the total heat input needed to accomplish a rapid heating to temperatures above the upper critical (austenitizing) temperature is proportional to the density and size of the workpiece and also to rate of travel of the hot zone.

Although this statement in no way is intended to define the scope of this invention, the specific method disclosed hereafter may be summarized briefly as follows:

(I) Heat is applied (at a very high rate, such as by oxyacetylene torches) with the heat source stationary and the hot zone centered over the region of the weld (or other part to be heat treated) until the temperature of this region exceeds the upper critical (austenitizing) temperature as previously defined herein;

(II) The heat source is then moved rapidly along the workpiece until the desired steep temperature gradient has been established at the leading edge of the hot zone;

(III) The direction of travel of the heat source is then reversed, and a quenching spray is started and follows a short distance behind the heat source in this reverse direction of travel;

(IV) The heat source proceeds back across the starting point at the weld region and continues until a similar desired steep temperature gradient is established at the other side thereof, at which time the heat source is shut off, while travel of the quenching spray proceeds; and (V) When the quenching spray has passed over this transition zone in which the steep temperature gradient has been established at this other side, the quenching spray is shut off.

FIG. 1 is a sketch representing the rough outline and organization of one form of apparatus which may be used to perform heat treatment of rails in accordance with this invention;

FIG. 2 is an end view of a rail and the arrangement of torches constituting a heat source used in this method of heat treatment;

FIG. 7 is a hardness diagram for a typical rail section that has been hardened in accordance with this invention.

Figure 3:
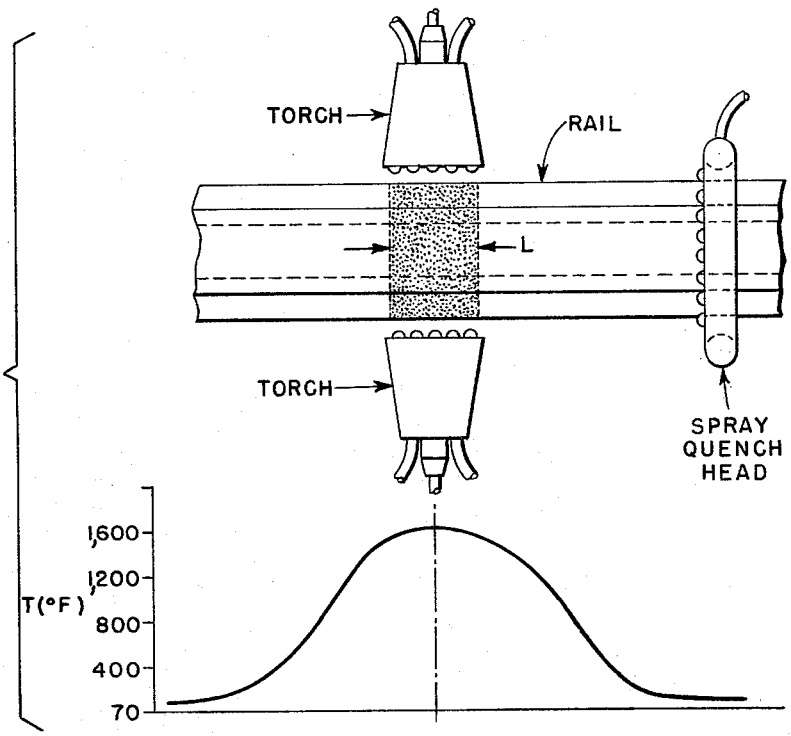
FIGS. 3, 4, 5 and 6 are diagrams serving to illustrate the temperature gradients in the rail or workpiece and their relation to travel of the heat source and cooling means.

Through the application of certain principles and theories herein, this invention can be employed in the heat treatment of a variety of standard shapes such as bars, plates and tubes, and special sections such as rail or structural beams. However, because this invention was perfected in connection with the welding and heat treating of mill-hardened "crane" type rail, this will be used as an example for present purposes of description, but without intent thereby to limit the scope of the invention. (This steel rail typically contains 0.67% to 0.82% carbon and 0.60% to 1.00% manganese.) Thus, in this description the "workpiece" will be referred to as being adjacent sections of rail that have been joined by a fusion welding process. For example, in my copending application, Serial No. 251,613, filed Jan. 15, 1963, there is disclosed a process, known as submerged melt, enclosed electric arc welding, which was developed specially for the joining of rails in place.

The method of heat treatment according to this invention involves the use of only two means, namely, a source of great heat input that is movable relative to a workpiece and a similarly movable cooling means. ("Relative" movement is involved because in certain cases the workpiece might be shifted relative to stationary heat source and cooling means if desired.) For reasons discussed hereafter it is preferred that cooling be effected by means providing either a water or oil quenching spray. The heating, however, might be performed by various sources, such as electric induction heaters, but it has been found that very satisfactory heating is provided by torches operating on a mixture of oxygen and natural gas, propane or acetylene. The movement of these means and the regulation of their respective heating and cooling functions can be performed manually or semi-manually, although preferably these operations are performed by a fully automated piece of apparatus. In the latter case, the apparatus may be arranged as roughly illustrated in FIG. 1. This form of apparatus has proved highly successful in the heat treatment of rails, and with minor variations it can be adapted to use in various other situations involving differently shaped work. The basic parts are a mobile carrier, a fixed cycle programmer and driving means, and a supply (not shown) of gaseous fuel. At each side of the carriage (FIG. 2) a torch is mounted in position to produce a flat horizontal flame, roughly three and a half inches by one and a half inches in cross section, to impinge against the middle rail section. Also at opposite sides of the carriage are spray quench heads constituted by nozzles adapted to convert a high rate of liquid flow into a high velocity spray directed against the rail sides. Accompanying the apparatus is a mobile rack (not shown) containing tanks of gaseous fuel. Water to be used as the quenching medium usually is available from a central municipal or industrial source. Incorporated in the gaseous fuel and quenching liquid feed systems are conventional valves which are operable to govern their release at appropriate phases of the heat treating cycle. Shields desirably are provided both to protect surroundings and to effect concentrated utilization of heat.

The carriage is reciprocable back and forth across a weld or other region to be treated, and although as previously suggested this can be performed manually, it can also be performed by a fully automated drive unit. The drive unit is temporarily secured to the rail by clamps as shown. Within the unit there is a lead screw which is rotatable to drive, in either direction, a nut and a rod connected to the carriage. The lead screw is driven by a motor, which is controlled in its starting, stopping, speed and reversing by an automatic cycle programmer. The various phases of the heat treating cycle will be described hereafter, and if this particular form of apparatus is employed the machine operation is simply programmed according to this cycle.

Reference will be made to FIGS. 3 to 7 for a general description of the successive phases of the heat treating cycle. Referring first to FIG. 7, however, let it be assumed that heat treatment is to be performed on a length of rail which has been fusion-welded (for example, by the process disclosed in the above-identified copending application) and that this has created a "soft zone" in which the hardness typically might be about 50 to 100 Brinell points less than the hardness previous to welding.

The first step (FIG. 3) is to move the torches into position opposite the "soft zone" or starting point. The quenching spray remains off, and the torches are ignited. The torches are held stationary while a hot zone is established. Eventually, this zone will obtain a temperature of approximately 1600° F. It has been found that this initial stage of heating will require approximately five minutes in standard "132 lb." (per yard) rail or six minutes in standard "175 lb." (per yard) rail.

Before proceeding to the next stage of the cycle, it should be realized that if rail in the heated condition represented by the curve at the lower portion of FIG. 3 were quenched rapidly, this would create wide soft zones at opposite sides of the peak of the curve. The considerable width of such soft zones would be due to the length of the gradual sloping sides of this curve.

Continuing, the next phase is the movement of the torches toward the right (FIG. 4) at a rapid (and preferably constant) rate of travel. Due to a combination of very high heat input rate and rapid travel, there is soon developed, a few inches from the starting point, a steep gradient in which temperature drops off from approximately the 1550°–1600° F. range to below 900° F. within an increment of less than one inch. (In effect, the rapidly moving torches are injecting heat into the rail at a rate faster than the "thermal front" at the leading edge of the hot zone, or in other words faster than the heat can be dissipated.) When the torches reach this position, shown in FIG. 4, the carriage is reversed and the spray is turned on. The spray quench head, now traveling toward the left approximately 18 inches behind the nozzle, passes over the portions of sharp temperature gradient shown at the right side of the curve in FIG. 4, thereby quenching the rail. It is important to note that only a very narrow increment of rail is quenched from a temperature lying between the upper and lower critical temperatures. The torches continue to burn and to travel toward the left at the same substantially uniform rate.

Figure 5:
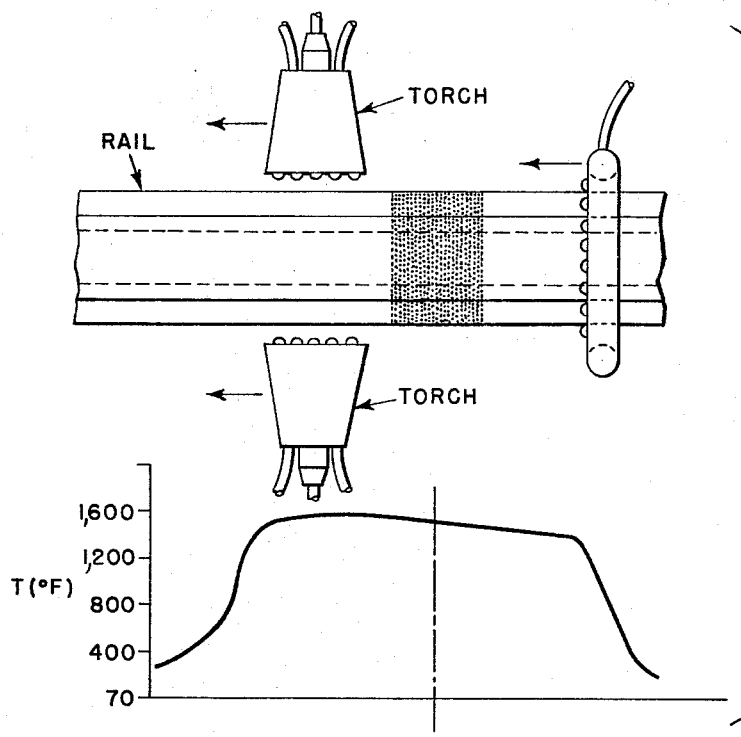
Figure 6:
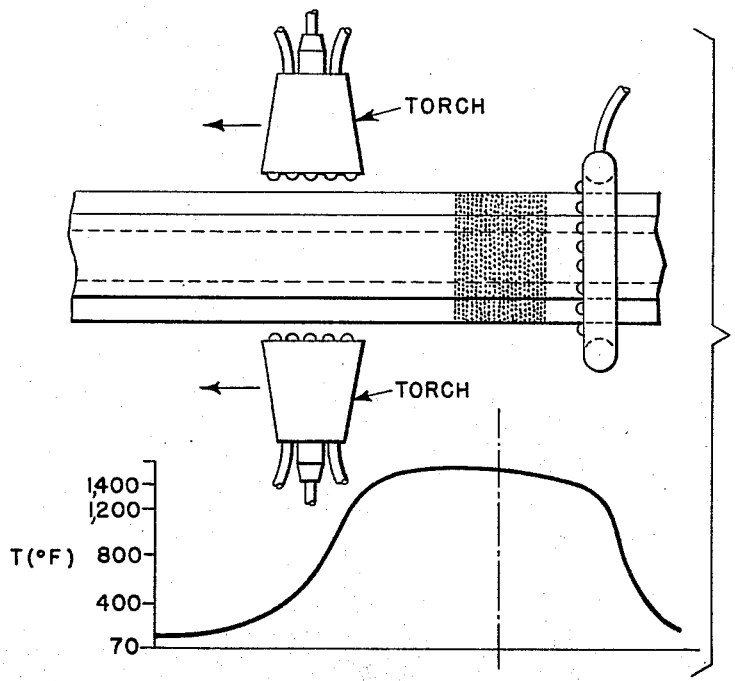

Referring next to FIG. 5, while quenching is taking place behind the torches, they are creating a new thermal front, with a sharp temperature gradient, at the opposite side. Again, it will be noted that the left hand side of the temperature curve, FIG. 5, drops off very sharply between the 1550°–1600° F. range to below 900° F. Thus, the increment of rail which attains a maximum temperature on this critical portion of curve is proportionally very narrow. When, then, the torches have reached this position of creating a steep thermal front, and have passed beyond the original softened zone, they are extinguished, while the quenching spray continues to travel toward the left. The spray quench head eventually reaches and passes over this region of steep thermal gradients and quenching starts from the temperature represented by the drawn curves. After passing beyond substantially the end of the hot zone, the sprays are shut off.

Reference has been made to the speed of the carriage in both directions of travel. A speed of approximately two inches per minute has been found to be proper for the treatment of either 132 lb. or 175 lb. rail.

Following the procedure described above, it is generally desirable to re-temper the section that has been quench-hardened. This re-tempering is particularly desirable in the case of rail to increase strength, for resistance to shock loading, though possibly at the expense of a slight loss in hardness. Re-tempering in such cases is accomplished by re-lighting the torches and moving them in a quick pass across the rail at approximately six inches per minute for 175 lb. rail and eight inches per minute for 132 lb. rail. Due to these higher speeds the rail does not exceed the lower critical temperature of 900° F. (Tempering is not dependent upon temperature gradients but only on maximum temperatures.) The quenching sprays are not operative during this re-tempering.

The results of this heat treating are illustrated by the hardness diagram of a typical re-hardened rail section in FIG. 7. The extent of the initial soft zone which resulted from fusion welding is indicated by the dashed lines. Following heat treatment, in this same area the hardness has been restored to its original hardness of approximately 300 Brinell, but at points spaced approximately six inches from the original softened weld zone there are created very narrow regions of slightly reduced hardness. As evident from FIG. 7, these "substituted" soft points are negligibly small as compared to the size of the workpiece cross-section. For example, in the case of rail the width of each of these points typically might measure less than ¼ inch in width; also, the slight degree of softness thereof is appreciably less than the high degree of softness of the "initial soft zone." Hence, these substituted soft points are negligible in terms of both size and reduction in hardness.

In the actual heat treatment of 132 lb. and 175 lb. rails, which have been picked as examples herein, certain specifications have been proved to be successful as follows: If acetylene is used as a fuel, the air to fuel ratio should be 1:1 in terms of volumetric flow rate. The torches (each a Linde 30-flame head) consume 2.6 cubic feet per minute per torch, representing an available heat input of approximately 470,000 B.t.u. per hour. Using water as a quenching medium, the total consumption during each cycle of operation of the sprays is approximately twenty gallons. This seemingly small water consumption is attributable to the fact that 81,000 B.t.u. are consumed in the boiling of only 0.15 gallon of water per minute, and this is comparable to the heat content to be removed during the entire quenching phase.

With regard particularly to the quenching, the spacing of the spray quench head from the torches is in the interest of reducing the severity of the quench to avoid cracking. Although other quenching mediums such as oil and air can be used, water obviously is the most available and economical.

It should now be evident from the above description that this invention involves the development of certain theories associated with thermal cycles and distributions in moving heat sources and sinks. These theories will be elaborated briefly in order that the wide applicability of this invention to various situations will be made clear. In particular, it is important to understand the factors which influence establishment of the steep temperature gradients which are an essential part of this invention.

These factors can be defined mathematically and applied to the facts of a given case as will be illustrated by taking the 175 lb. rail as an example. This rail typically will have the following properties:

$W$ (weight per unit length) = 175 lb./yd.
$C$ (specific heat) = 0.15 B.t.u./lb. ° F.
$a$ (thermal diffusivity) = 0.29 sq. ft./hr.

The equations by which the behavior of traveling thermal fronts in such a structure can be predicted are derived as follows:

As is usual in cases of this kind, simplifying assumptions are made to render analysis tractable, without changing the essential meaning. In this case, the principal assumption is that heat is supplied to the longitudinal member uniformly within the hot zone, $L$ (FIG. 3) and there is no heat transfer outside this zone except by conduction along the member. The physical picture developed on the basis of this asumption reflects the actual situation quite accurately even though, with the actual heat supply, such a battery of torches or induction coils, there would not be a perfectly sharp demarcation at the boundary of the hot zone. Of principal interest is the temperature distribution within the hot zone, which may be expressed as a function of the distance $x$ from the trailing edge of the hot zone; the total length $L$ of the hot zone; the total rate of heat input $q$; the rate of travel $S$ of the hot zone; the weight $W$ per unit length of the longitudinal member; and the thermal diffusivity $a$ and specific heat $c$ of the solid material.

Where $T$ is the temperature at point $x$ and $T_o$ is the initial (ambient) temperature, then (1)
$$T - T_o = \frac{q}{S \cdot W \cdot c}\left[\left(1 - \frac{x}{L}\right) + \frac{a}{SL}\left(1 - e^{-\left(\frac{Sx}{a}\right)}\right)\right]$$

The temperature distribution in front of the leading edge of the hot zone is given by the following equation:

(2)
$$T - T_o = \frac{a}{S^2 W \cdot c}\left(\frac{q}{L}\right) \times e^{-\left(\frac{Sx}{a}\right)}\left[e^{\left(\frac{Sl}{a}\right)} - 1\right]$$

Equation 2 demonstrates that there is very little heating in front of this leading edge.

The temperature experienced immediately behind the trailing edge of the hot zone is given by the following equation:

(3)
$$T_p - T_o = \frac{q}{S \cdot W \cdot c}$$

In Equation 3, $T_p$ is the maximum temperature experienced by the workpiece. For steel, $T_p$ would be somewhat higher than the austenitizing temperature.

To a very close approximation, Equation 1 can be simplified as follows:

(4)
$$T - T_o = \frac{q}{S \cdot W \cdot c}\left(1 - \frac{x}{L}\right)$$

Figure 4:
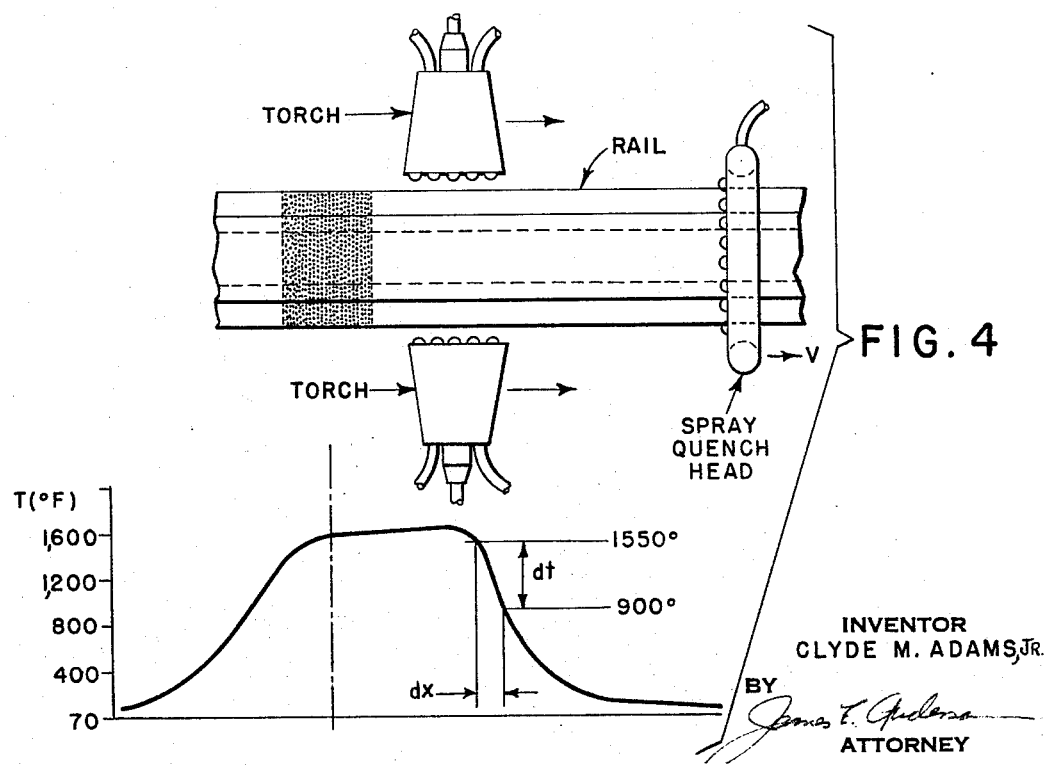

Numerical work with Equation 1 shows that the slope of the curve, which is $dt/dx$ in FIG. 4, determines the temperature gradient in the significant "transition zone," and is nearly constant in accordance with the following relation:

(5) $$\frac{dt}{dx} = \frac{q}{S \cdot W \cdot c \cdot L}$$

Equation 5 quantitatively confirms: (a) that increasing the total heat input $q$ and decreasing the length L of the hot zone, will effect a desirable increase in the temperature gradient $dt/dx$.

Returning to the properties previously given for 175 lb. rail, these equations will reveal that it should be treated by a traveling heat source three and a half inches in length L, moving at a speed S of two inches per minute. This requires a total heat input $q$ of 141,000 B.t.u./hr. to obtain a maximum temperature $T_p$ of 1550° F. Assuming that all of the heat is removed by the quench, the cooling sprays must supply 0.3 to 0.5 gallon of water per minute.

It will be evident that various departures from the specifically disclosed method can be effected without departing from the scope of the invention. For example, although this invention has been described in its application to the heat treatment of low alloy steels in particular, it is applicable as well to a wide variety of other heat treatable metals in general, particularly those in which the heat treatment is for the purpose of strengthening and involves a rapid cooling or quench from elevated temperature. Such metals or alloys have in common certain characteristic critical temperatures which in a sense make up a transition range similar to that encountered in the treatment of low alloy steel. For example, a precipitation-hardening alloy has an upper critical temperature in that if the metal is quenched or rapidly cooled from above this upper critical temperature it can be strengthened or hardened by reheating to a lower critical temperature. After the metal has been so heat treated, any subsequent thermal processing which causes any part of it to be heated to a temperature between these upper and lower critical temperatures will suffer a loss in hardness or strength. Metal which is heated only to a temperature below the lower critical temperature will be unaffected, and metal which is heated above the upper critical temperature and then rapidly cooled, followed by re-heating to the lower critical temperature, will develop full restoration of the original heat treated strength and hardness. Thus, this invention is applicable to any thermal processing wherein a part has been heated to a temperature between upper and lower critical temperatures, and held in this transition temperature range long enough for solid state reactions to take place, whereby it has been softened or weakened to an extent which is irreparable except by complete re-heat treatment. Complete re-heat treatment is intended to mean a re-heating to a temperature above the upper critical, quenching or rapidly cooled to well below the lower critical, and reheat to the lower critical temperature. It is a principal purpose of this invention to perform thermal manipulations which permit such "re-heat treatment" for the restoration of properties to be accomplished in a local area or zone, and in such a way that any area experiences only as brief as possible an excursion into the transition temperature range. By minimizing the geometric extent of any such area and its exposure time, these adversely heat treated regions can be rendered harmless in the overall structure.

What is claimed is:

1. A method of hardening a narrow localized region of a metal structure which is hardenable by rapid quenching from above a characteristic critical temperature, comprising the steps of rapidly heating said region to above said critical temperature by means of a source of relatively high heat input; then moving said source along said structure in a direction away from said region until a moving thermal front is established wherein the temperature gradient drops substantially and steeply from said critical temperature in a very short distance directly ahead of said source; then reversing the direction of travel of said source and moving it back across said region toward the other side thereof; moving a quenching cooling source over said thermal front in a direction following behind said source as it proceeds toward the other side of said region; continuing the travel of the heat source until a second thermal front of steep thermal gradient similarly is established at said other side and then interrupting the application of heat thereto; and continuing the movement of said cooling source until it passes over said second thermal front.

2. The method of quenching a local region in a heat treatable metal part from above a given critical temperature without creating substantial surrounding areas which are adversely quenched from lower intermediate temperatures, which comprises heating said local region to a temperature at or above said critical temperature; relatively moving the heat source along said part in a direction away from said local region, the relative rate of travel of said source and the heat input thereof being calculated to result in a moving thermal front of steep temperature gradient characterized by a drop in temperature from said critical temperature through said lower intermediate temperature along a very narrow transition region in said part; reversing the direction of travel of said source when said steep temperature gradient has been established and moving the source in the other direction while continuing said heat input; moving a quenching cooling means relative to the part; said cooling means being in trailing relationship to said heat source as the same moves in said other direction; whereby said very narrow transition region and said local region initially heated are quenched; continuing the movement of said heat source back across said local region until a second thermal front of similarly steep temperature gradient is established at the other side thereof and then interrupting said heat input; continuing the relative movement of said cooling means back across said local region and over said second thermal front, and thereafter interrupting the quenching by said cooling means.

3. A method of hardening a localized region of a relatively large steel member comprising the steps of rapidly heating said region over the austenitizing temperature by means of a stationarily positioned heat source of high heat input rate; then moving said heat source along said structure and away from said region at a rate calculated to establish an advancing thermal front wherein there is a sharp transition from above the austenitizing temperature to below the tempering temperature in a very short distance along the path of travel of the heat source; reversing the direction of movement of said heat source after said sharp transition has been established and moving the heat source back across said region toward the other side thereof; moving a quenching means over said structure, across said short distance in which said transition has been established, and across said region in trailing relation to the moving heat source; continuing the movement of said heat source until a second thermal front wherein there is a similar sharp transition is established and then interrupting the input of heat therefrom; and continuing the movement of said cooling means across said second thermal front.

4. A method of hardening a localized region of a relatively large steel member comprising the steps of rapidly heating said region above the austenitizing temperature by means of a stationarily positioned heat source of high heat input rate; then moving said heat source along said structure and away from said region at a rate calculated to establish an advancing thermal front wherein there is a sharp transition from above the austenitizing temperature to below the tempering temperature in a very short distance along the path of travel of the heat source; reversing the direction of movement of said heat source after said sharp transition has been established and moving the heat source back across said region toward the other side thereof; moving a quenching means over said structure, across said short distance in which said transition has been established, and across said region in trailing relation to the moving heat source; continuing the movement of said heat source until a second thermal front wherein there is a similar sharp transition is established continuing the movement of said cooling means until after said second thermal front has been passed and then interrupting the quenching; and passing a heat source over the entire section of said structure which has been heated and quenched a relatively higher rate of speed calculated to effect tempering of the structure.

5. A method of rehardening conventional rail in which steel rail sections weighing between approximately 132 and 175 pounds per yard have been joined by welding, whereby a soft region has been created in the vicinity of the welded joint, comprising the steps of rapidly heating said region to a temperature in the general range of 1550° F. to 1600° F. by means of a stationary heat source having a high rate of heat input; moving said heat source along said rail at a speed of approximately two inches per minute; continuing said movement until there is established in the advancing thermal front a steep temperature gradient wherein temperature drops from said first-mentioned range to below the tempering temperature in a very short portion of the rail length; reversing the direction of travel of said heat source and moving the same back across said region toward the other side thereof; moving a quenching means along the rail and across said short rail portion in trailing relation to said heat source; continuing the movement of said heat source at approximately two inches per minute until a second and similar thermal part of steep temperature gradient is established at the other side of said region and then interrupting said heat input; and continuing the movement of said quenching means across said region and said second thermal front.

6. A method of rehardening conventional rails in which steel sections weighing between approximately 132 and 175 pounds per yard have been joined by welding whereby a soft region has been produced in the vicinity of each welded joint, comprising the steps of heating said region by gas-flame torch means producing a heat rate capable of raising the steel temperature to approximately 1600° F. within five to six minutes; then moving said source along the rail toward one side of said region at a rate of approximately two inches per minute until an advancing thermal front is established wherein the temperature drops sharply from approximately 1600° F. to below approximately 900° F. within a very short distance along the rail length; then reversing the direction of travel of said torch means toward the other side of said region; moving a quenching fluid spray over said rail at a distance behind said torch means; continuing the movement of said torch means toward said other side of said region at approximately two inches per minute until a second said thermal front is similarly established at said other side; and continuing the movement of said quenching fluid spray across said region and said second thermal front.

7. A method of rehardening conventional rails in which steel sections weighing between approximately 132 and 175 pounds per yard have been joined by welding whereby a soft region has been produced in the vicinity of each welded joint, comprising the steps of heating said region by gas-flame torch means producing a heat input rate capable of raising the steel temperature to approximately 1600° F. within five to six minutes; then moving said source along the rail toward one side of said region at a rate of approximately two inches per minute until an advancing thermal front is established wherein the temperature drops sharply from approximately 1600° F. to below approximately 900° F. within a very short distance along the rail length; then reversing the direction of travel of said torch means toward the other side of said region; moving a quenching fluid spray over said rail at a distance behind the torch means; continuing the movement of said torch means toward said other side of said region at approximately two inches per minute until a second said thermal front is similarly established at said other side; continuing the movement of said quenching fluid spray across said region and said second thermal front; and tempering the rail by passing said torch means across same at a speed of 6 to 8 inches per minute.

8. The method of quenching a local region in a heat treatable metal part from above a given critical temperature without creating substantial surrounding areas which are adversely quenched from lower intermediate temperatures, which comprises heating said local region to a temperature at or above said critical temperature; relatively moving the heat source along said part in a direction away from said local region, the relative rate of travel of said source and the heat input thereof being calculated according to the relation $$\frac{dt}{dx} = \frac{q}{SWcL}$$

to result in a moving thermal front of steep temperature gradient characterized by a drop in temperature from said critical temperature through said lower intermediate temperature along a very narrow transition region in said part, wherein $dt/dx$ represents the drop in temperature per increment of width of said transition region, $q$ represents the heat input rate, $S$ represents the rate of travel of said source, $W$ represents the weight per unit length of the part, $c$ represents the specific heat of the metal, and $L$ represents the length of the zone along which heat is transferred from the heat source; then reversing the direction of travel of said source when said steep temperature gradient has been established and moving the source in the other direction while continuing said heat input; moving a quenching cooling means relative to the part; said cooling means being in trailing relationship to said heat source as the same moves in said other direction, whereby said very narrow transition region and said local region initially heated are quenched; continuing the movement of said heat source back across said local region until a second thermal front of similar steep temperature gradient is established at the other side thereof, and then interrupting said heat input; continuing the relative movement of said cooling means back across said local region and over said second thermal front; and thereafter interrupting the quenching by said cooling means.

No references cited.

DAVID L. RECK, *Primary Examiner.*

C. N. LOVELL, *Assistant Examiner.*